United States Patent
Lee et al.

(10) Patent No.: US 9,798,186 B2
(45) Date of Patent: Oct. 24, 2017

(54) BACKLIGHT UNIT HAVING UNIFORM BRIGHTNESS

(71) Applicant: SAMSUNG DISPLAY CO., LTD., Yongin, Gyeonggi-do (KR)

(72) Inventors: Jiwon Lee, Suwon-si (KR); Sangwon Lee, Seoul (KR); Young-Min Park, Hwaseong-si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 241 days.

(21) Appl. No.: 14/690,186

(22) Filed: Apr. 17, 2015

(65) Prior Publication Data
US 2016/0124269 A1 May 5, 2016

(30) Foreign Application Priority Data
Oct. 30, 2014 (KR) .................. 10-2014-0149403

(51) Int. Cl.
*G02F 1/1335* (2006.01)
*G09G 3/34* (2006.01)
*H05B 33/08* (2006.01)

(52) U.S. Cl.
CPC ....... *G02F 1/133603* (2013.01); *G09G 3/342* (2013.01); *G09G 3/3413* (2013.01);
(Continued)

(58) Field of Classification Search
CPC ......... G02F 1/133603; G02F 1/133609; G02F 2001/133612; G02F 2001/133613; G09G 3/3413; G09G 3/342; G09G 2320/0233; G09G 2320/0242;
(Continued)

(56) References Cited

U.S. PATENT DOCUMENTS 7,648,254 B2 * 1/2010 Yoo ...................... H05K 1/0206
362/249.01
7,740,365 B2 * 6/2010 Huttner ............. G02F 1/133603
349/69
(Continued)

FOREIGN PATENT DOCUMENTS

JP 2006278125 10/2006
KR 1020070074825 7/2007
(Continued)

*Primary Examiner* — Bao Q Truong
(74) *Attorney, Agent, or Firm* — F. Chau & Associates, LLC

(57) ABSTRACT

A backlight unit according to an embodiment of the inventive concept includes a driving substrate and a plurality of first clusters and a plurality of second clusters arranged in rows and columns on the driving substrate, wherein the first clusters and the second clusters are alternately arranged in each row on the driving substrate, wherein at least one of the first clusters and at least one of the second clusters are repeatedly disposed in each column on the driving substrate, wherein each of the first clusters and each of the second clusters includes a plurality of light emitting diodes (LEDs), the first and second clusters having structures inverted to each other, wherein each of LEDs that are most adjacent to a row directional edge of the driving substrate, among the LEDs of the first and second clusters, is connected in parallel to a resistor.

20 Claims, 8 Drawing Sheets

(52) U.S. Cl.
CPC ... *H05B 33/0827* (2013.01); *G02F 1/133609* (2013.01); *G02F 2001/133612* (2013.01); *G02F 2001/133613* (2013.01); *G09G 2320/0233* (2013.01); *G09G 2320/0242* (2013.01)

(58) Field of Classification Search
CPC ........... H05B 33/0827; F21Y 2101/00; F21Y 2105/10; F21Y 2105/12; F21Y 2113/10; F21Y 2113/13; F21Y 2115/10
See application file for complete search history.

(56) References Cited

U.S. PATENT DOCUMENTS

| | | | |
|---|---|---|---|
| 7,905,618 B2 * | 3/2011 | Kim | G02F 1/133603 362/218 |
| 8,220,944 B2 * | 7/2012 | Kim | G02F 1/133603 313/500 |
| 8,421,094 B2 * | 4/2013 | Ishizaki | F21V 3/00 257/88 |
| 8,446,547 B2 | 5/2013 | Kim | |
| 2007/0258266 A1 * | 11/2007 | Baek | G02F 1/133603 362/612 |
| 2014/0035960 A1 | 2/2014 | You et al. | |
| 2015/0146420 A1 * | 5/2015 | Alferink | A01K 29/00 362/231 |

FOREIGN PATENT DOCUMENTS

| | | |
|---|---|---|
| KR | 1020110013925 | 2/2011 |
| KR | 1020110026733 | 3/2011 |
| KR | 1020110043863 | 4/2011 |

\* cited by examiner

BACKLIGHT UNIT HAVING UNIFORM BRIGHTNESS

CROSS-REFERENCE TO RELATED APPLICATIONS

This application claims priority under 35 U.S.C. §119 to Korean Patent Application No. 10-2014-0149403, filed on Oct. 30, 2014 in the Korean Intellectual Property Office (KIPO), the contents of which are herein incorporated by reference in its entirety.

TECHNICAL FIELD

The present disclosure relates to a backlight unit, and more particularly, to a backlight unit having uniform brightness.

DISCUSSION OF THE RELATED ART

Modern display devices include backlight units that contain a plurality of light emitting diodes (LEDs). According to the position of the light source, backlight units that contain LEDs may be classified as edge-type backlight units, or direct-type backlight units.

In an edge-type backlight unit, bar-type LEDs are positioned at a side of a display panel. In an edge-type backlight unit, light that is generated at the side of the display panel is guided to the LCD panel by a light guide. In a direct-type backlight unit, LEDs are positioned under the display panel. In a direct-type backlight unit, a light source having substantially the same surface area as the surface area of the display panel emits light towards the front surface of the display panel.

In general, a backlight unit generates white light using a red LED, a green LED and a blue LED in combination. In particular, in a direct-type backlight unit, LEDs positioned at the center of the backlight unit may output white light by combining colors. However, LEDs positioned at the edges of the backlight unit may be unable to generate uniform white light due to a limitation in the combination of color at the edges.

SUMMARY

The present disclosure provides a backlight unit capable of emitting uniform white light from a direct-type backlight unit.

Embodiments of the inventive concept provide backlight units that include a driving substrate, a plurality of first clusters and a plurality of second clusters arranged in rows and columns on the driving substrate. The first clusters and the second clusters are alternately arranged in each row on the driving substrate. Each column on the driving substrate contains exclusively a plurality of first clusters or exclusively a plurality of second clusters. Each of the first clusters and each of the second clusters includes a plurality of light emitting diodes (LEDs), the first and second clusters having structures inverted with respect to each other. Each of LEDs that are most adjacent to row directional edges of the driving substrate, among the LEDs of the first and second clusters, is connected in parallel to a resistor.

In some exemplary embodiments, each of the first clusters and each of the second clusters may have an equilateral triangular shape.

In some exemplary embodiments, each of the first clusters and each of the second clusters may have an isosceles triangular shape.

In some exemplary embodiments, each of the first clusters and each of the second clusters may be formed by a red LED, a blue LED and a green LED.

In some exemplary embodiments, the first clusters and the second clusters may be arranged on the driving substrate on the basis of a plurality of groups.

In some exemplary embodiments of the inventive concept, backlight units include a first driving substrate, a plurality of first clusters and a plurality of second clusters arranged in rows and columns on the first driving substrate, a second driving substrate arranged adjacent to a first side of the first driving substrate, the second driving substrate including a plurality of first light emitting diodes (LEDs), and a third driving substrate arranged adjacent to a second side of the first driving substrate, the third driving substrate including a plurality of second LEDs. The first clusters and the second clusters are repeatedly and alternately arranged in each row on the first driving substrate. Each column on the driving substrate contains exclusively a plurality of first clusters or exclusively a plurality of second clusters. Each of the first clusters and each of the second clusters includes a plurality of third LEDs, the first and second clusters having structures inverted with respect to each other.

In some exemplary embodiments, each of the first clusters and each of the second clusters may be formed by a red LED, a blue LED and a green LED.

In some exemplary embodiments, each of the first and second LEDs may be implemented by one of red, blue or green LEDs.

In some exemplary embodiments, each of the first clusters and each of the second clusters may have a triangular shape.

In some exemplary embodiments, the first and second sides may be arranged in a row direction.

In some exemplary embodiments, each of the first clusters and each of the second clusters may have a rectangular shape.

In some exemplary embodiments, each of LEDs that are most adjacent to either the first side or the second side of the first driving substrate, among the LEDs of the first and second clusters, may be connected in parallel to a resistor.

BRIEF DESCRIPTION OF THE DRAWINGS

The accompanying drawings are included to provide a further understanding of the inventive concept, and are incorporated in and constitute a part of this specification. The drawings illustrate exemplary embodiments of the inventive concept, and together with the description, serve to explain principles of the inventive concept. In the drawings.

DETAILED DESCRIPTION OF THE EMBODIMENTS

Figure 1:
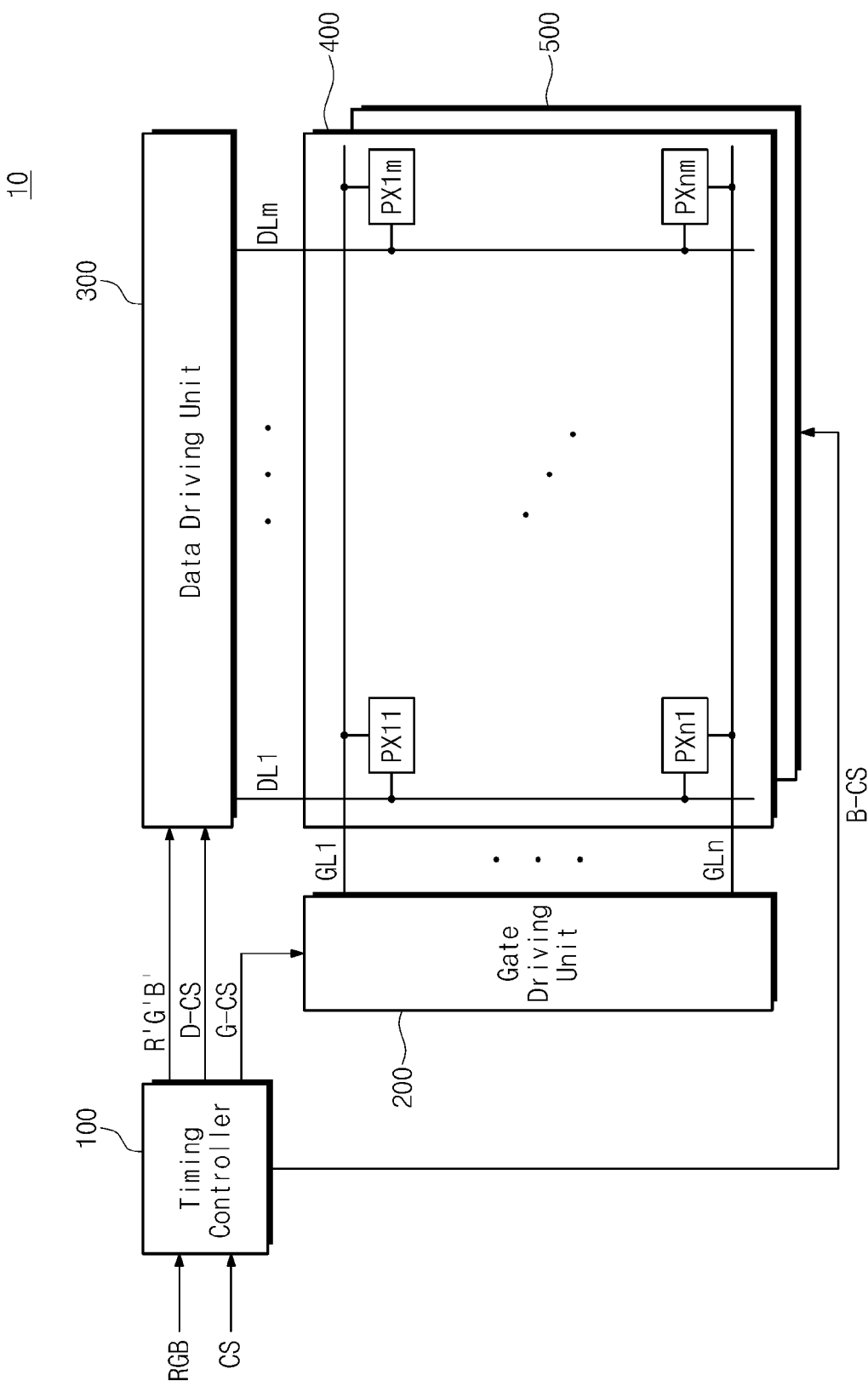
FIG. 1 is a block diagram illustrating a display device according to an exemplary embodiment of the inventive concept.

The present disclosure may be variously modified and may include various embodiments that are not described in this document. Thus, particular embodiments are exemplarily illustrated in the drawings and will be described in detail. However, it should be understood that the present disclosure is not limited to the described specific forms, but rather the present disclosure is intended to cover all modifications, equivalents or alternatives.

Like reference numerals may refer to like elements throughout the description of the drawings. In the drawings, the dimensions of structures are exaggerated or reduced for clarity of illustration. The terms "first", "second" and the like may be used for describing various elements, but the elements should not be construed as being limited by the terms.

FIG. 1 is a block diagram illustrating a display device according to an embodiment of the inventive concept.

Referring to FIG. 1, a display device 10 includes a timing controller 100, a gate driving unit 200, a data driving unit 300, a display panel 400 and a backlight unit 500.

The timing controller 100 receives a plurality of image signals RGB and a plurality of control signals CS from an external source. The timing controller 100 converts a data format of the image signals RGB so that the image signals are compatible with an interface with the data driving unit 300. Data-format-converted image signals R'G'B' are provided to the data driving unit 300.

The timing controller 100 may output a plurality of driving signals in response to the control signals CS. The timing controller 100 may generate a plurality of driving signals including a data driving signal D-CS and a gate driving signal G-CS. For example, the data driving signal D-CS may include an output initiation signal and a horizontal initiation signal. The gate driving signal G-CS may include a vertical initiation signal and a vertical clock bar signal. The timing controller 100 transfers the data driving signal D-CS to the data driving unit 300, and transfers the gate driving signal G-CS to the gate driving unit 200.

The gate driving unit 200 generates a plurality of gate signals in response to the gate driving signal G-CS provided from the timing controller 100. The gate driving unit 200 sequentially outputs the gate signals to the display panel 400 through a plurality of gate lines GL1 to GLn. A plurality of pixels PX11 to PXnm may be sequentially scanned on a per-row basis.

The data driving unit 300 converts the plurality of image signals R'G'B' into a plurality of data voltages in response to the data driving signal D-CS provided from the timing controller 100. The data driving unit 300 outputs the data voltages to the display panel 400 through a plurality of data lines DL1 to DLm.

The display panel 400 includes the gate lines GL1 to GLn, the data lines DL1 to DLm and the pixels PX11 to PXnm. The gate lines GL1 to GLn extend in a row direction and intersect with the data lines DL1 to DLm, which extend in a column direction. The gate lines GL1 to GLn are electrically connected to the gate driving unit 200 to receive the gate signals. The data lines DL1 to DLm are electrically connected to the data driving unit 300 to receive the data voltages. The pixels PX11 to PXnm are connected to corresponding gate lines and corresponding data lines.

The backlight unit 500 may receive a backlight control signal B-CS from the timing controller 100, and may output light to the display panel 400 in response to the backlight control signal B-CS. According to an exemplary embodiment of the inventive concept, the backlight unit 500 may have a direct-type structure in which a plurality of light emitting diodes (LEDs) are arranged on a rear surface of the display panel 400.

Figure 2:
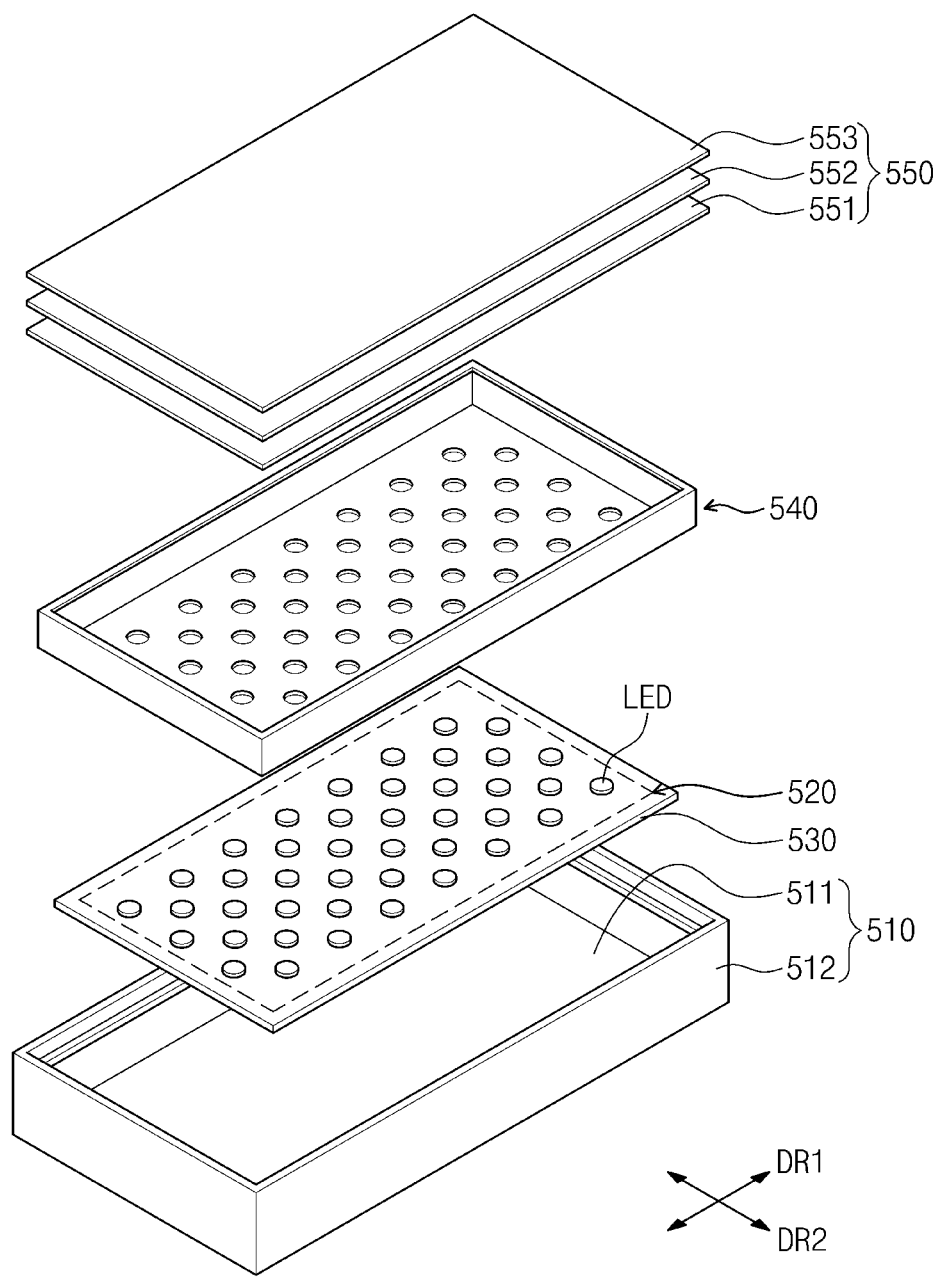
FIG. 2 is a perspective view of the backlight unit illustrated in FIG. 1.

FIG. 2 is a perspective view of the backlight unit illustrated in FIG. 1.

Referring to FIG. 2, the backlight unit 500 includes a bottom cover 510, a light source unit 520, a driving substrate 530, a reflective sheet 540 and an optical sheet 550.

The bottom cover 510 has an accommodating space formed therein to receive the light source unit 520, the driving substrate 530, the reflective sheet 540 and the optical sheet 550. The bottom cover 510 includes a bottom surface 511 and a side wall 512 protruding from the bottom surface 511. Both the outer and inner surfaces of the side wall 512 are extended in a vertical direction to the bottom surface 511, but the configuration of the side wall is not limited thereto. For example, the inner surface of the side wall 512 may be inclined with respect to the bottom surface 511. Furthermore, a stepped portion may be provided to the top of the side wall 512 to support the optical sheet 550.

FIG. 2 exemplarily illustrates that the bottom surface 511 has a rectangular shape, and the side wall 512 includes four side walls extended from four sides of the bottom surface 511. Herein, a long-side direction of the bottom surface 511 is defined as a first direction DR1, and a short-side direction of the bottom surface 511 is defined as a second direction DR2.

The light source unit 520 includes a plurality of LEDs for outputting light. The LEDs may be arranged on the driving substrate 530. Furthermore, the LEDs may be electrically connected to the driving substrate 530, and may output light in response to a light source driving signal provided from the driving substrate 530.

According to an exemplary embodiment of the inventive concept, the LEDs may be arranged on the driving substrate 530 in the form of a plurality of clusters triangularly arranged. The arrangement of the LEDs on the driving substrate 530 will be described in detail with reference to FIG. 3.

The driving substrate 530 is disposed between the bottom surface 511 and the reflective sheet 540. The driving substrate 530 is electrically connected to the light source unit 520 to provide the light source driving signal to the LEDs. Although the driving substrate 530 illustrated in FIG. 2 is displayed to include one structure, the driving substrate 530 may include a plurality of structures. Furthermore, the driving substrate 530 may receive the backlight control signal B-CS provided from the timing controller 100 (see FIG. 1). In response to the backlight control signal B-CS, the driving substrate 530 may generate the light source driving signal provided to the LEDs.

The reflective sheet 540 is disposed on the inner surface of the bottom cover 510 and on the driving substrate 530. For example, the reflective sheet 540 may include a plurality of grooves. The LEDs may be electrically connected to the driving substrate 530 through the grooves of the reflective sheet 540. Furthermore, the reflective sheet 540 may be disposed on the top surface and the inner surface of the side wall 512. The reflective sheet 540 reflects a greater part of incident light.

The optical sheet 550 is received by the stepped portion formed on the side wall 512. For example, the optical sheet 550 may include a diffusing sheet 551, a light collecting sheet 552 and a protective sheet 553. The diffusing sheet 551 serves to diffuse incident light. The light collecting sheet 552 serves to increase luminance of the light diffused by the diffusing sheet 551. The protective sheet 553 serves to protect the light collecting sheet 552 and secure a viewing angle. It is exemplarily illustrated that the optical sheet 550 includes three sheets; however, exemplary embodiments of the inventive concept are not limited thereto. Therefore, the optical sheet 550 may include less than three sheets or it may include more than three sheets.

Figure 3:
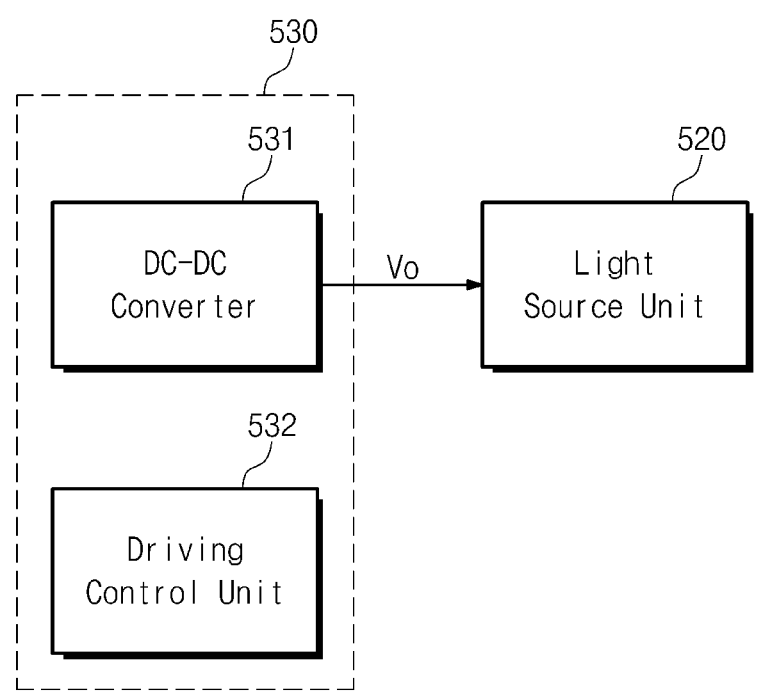
FIG. 3 is a circuit diagram illustrating an electrical connection between the driving substrate and the light source unit illustrated in FIG. 2.

FIG. 3 is a circuit diagram illustrating the electrical connection between the driving substrate and the light source unit illustrated in FIG. 2.

Referring to FIG. 3, the driving substrate 530 includes a DC-DC converter 531 and a driving control unit 532. The DC-DC converter 531 receives an input voltage from the outside. The DC-DC converter 531 converts the input voltage into a driving voltage Vo for operating the light source unit 520. The DC-DC converter 531 provides the driving voltage Vo to the light source unit 520.

The driving control unit 532 may adjust the driving voltage Vo in response to the backlight control signal B-CS provided from the timing controller 100.

The light source unit 520 receives the driving voltage Vo generated by the DC-DC converter 531. As described above with reference to FIG. 2, the light source unit 520 includes the plurality of LEDs, and the LEDs may generate light on the basis of the driving voltage Vo. The light source unit 520 may provide the generated light to the display panel 400 (see FIG. 1). Furthermore, the light source unit 520 is electrically connected to the driving control unit 532 to transfer a post-usage output voltage to the driving control unit 532. The driving control unit 532 may control the DC-DC converter 531 on the basis of the post-usage output voltage output from the light source unit 520.

Figure 4:
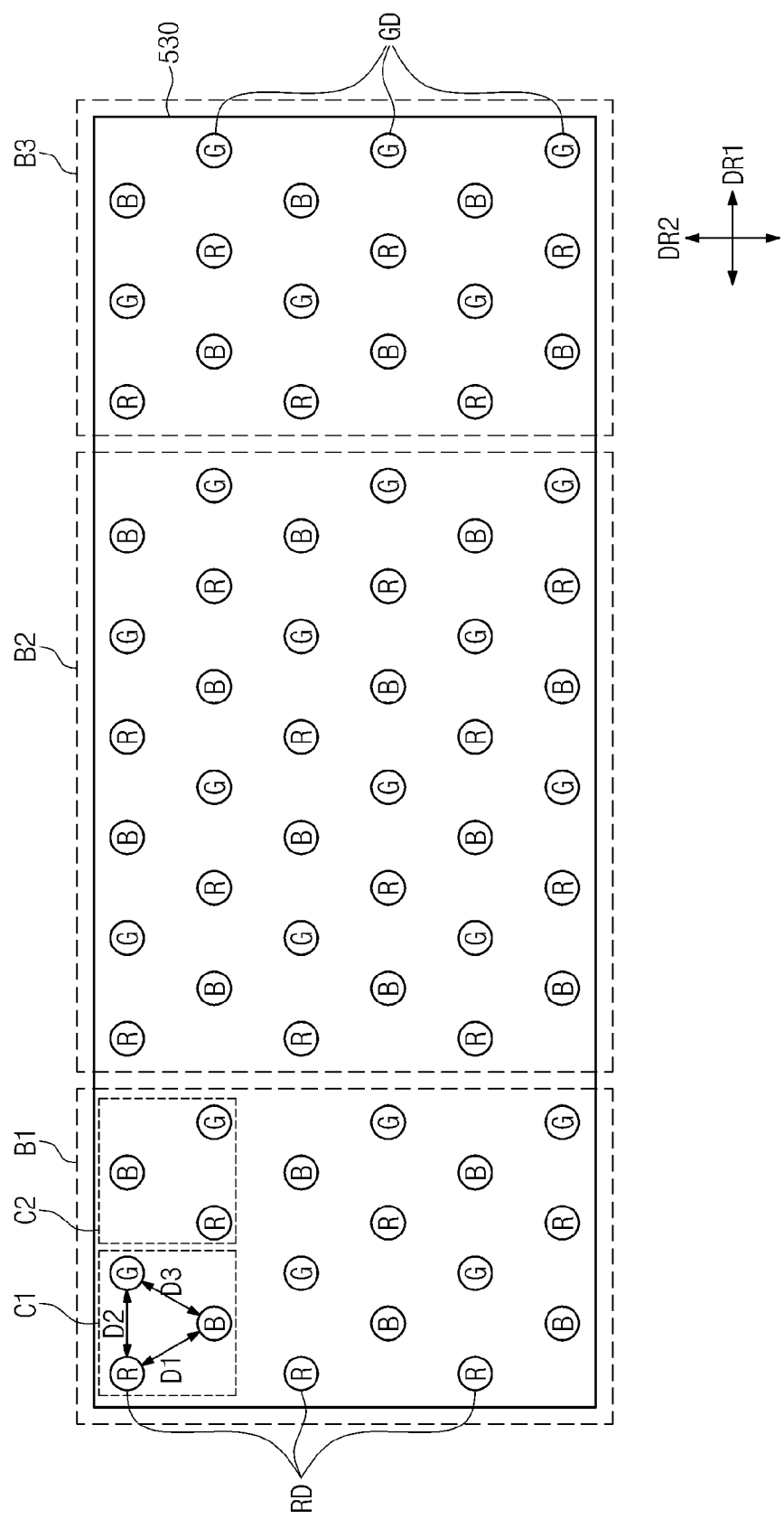
FIG. 4 illustrates a plurality of LEDs arranged on the driving substrate illustrated in FIG. 2 according to an exemplary embodiment of the inventive concept.

FIG. 4 illustrates the plurality of LEDs arranged on the driving substrate illustrated in FIG. 2 according to an exemplary embodiment of the inventive concept.

Referring to FIG. 4, a plurality of first clusters C1 and a plurality of second clusters C2, which form triangles, are arranged in rows and columns on the driving substrate 530. Each first cluster C1 and each second cluster C2 may include a plurality of LEDs and may have structures inverted to each other. For example, the first cluster C1 and the second cluster C2 may be alternately arranged on each row on the driving substrate 530. A plurality of first clusters C1 and a plurality of second clusters C2 may be repeatedly arranged on each row on the driving substrate 530. The LEDs may include a plurality of red LEDs R, a plurality of blue LEDs B and a plurality of green LEDs G.

Each of the first cluster C1 and the second cluster C2 may include the red LED R, the blue LED B and the green LED G. A first distance D1 between the red LED R and the blue LED B, a second distance D2 between the red LED R and the green LED G, and a third distance D3 between the blue LED B and the green LED G may be equal to one another. For example, the red LED R, the blue LED B and the green LED G may be arranged in the form of an equilateral triangle on the driving substrate 530.

However, the inventive concept is not limited thereto, and the distances among LEDs may be variously adjusted. For example, the red LED R, the blue LED B and the green LED G may be arranged in the form of an isosceles triangle on the driving substrate 530.

Furthermore, the LEDs may be arranged on the driving substrate 530 on the basis of first to third groups B1 to B3. The LEDs are divided into the first to third groups B1 to B3, but may be divided into more or fewer groups. A plurality of LEDs may be arranged in each group.

The light source unit 520 of FIG. 3 may output light of various colors through color combination of the red LEDs R, the blue LEDs B and the green LEDs G. For example, the light source unit 520 may use two green LEDs G, one red LED R and one blue LED B to output white light.

However, in general, the red LEDs R, the blue LEDs B and the green LEDs G might not be appropriately arranged at edges of the driving substrate 530. As a result, color irregularity may occur at an edge part of the display panel 400.

For example, the red LEDs R, the blue LEDs B and the green LEDs G may be regularly arranged at an edge part of the driving substrate 530 with respect to the first direction DR1. However, at an edge part of the driving substrate 530 with respect to the second direction DR2, the red LEDs R, the blue LEDs B and the green LEDs G are not regularly arranged. For example, as illustrated in FIG. 4, only three red LEDs RD are arranged at a left edge part of the driving substrate 530 with respect to the second direction DR2. For example, only three green LEDs GD are arranged at a right edge part of the driving substrate 530 with respect to the second direction DR2. As a result, color combination may not be accurately provided at the left and right edges of the driving substrate 530 with respect to the second direction DR2, causing color irregularity.

According to an exemplary embodiment of the inventive concept, the driving substrate 530 may adjust values of currents provided to the three red LEDs RD to satisfy light color combination. Likewise, the driving substrate 530 may adjust values of currents provided to the three green LEDs GD to satisfy light color combination. This operation will be described in detail with reference to FIG. 5.

Figure 5:
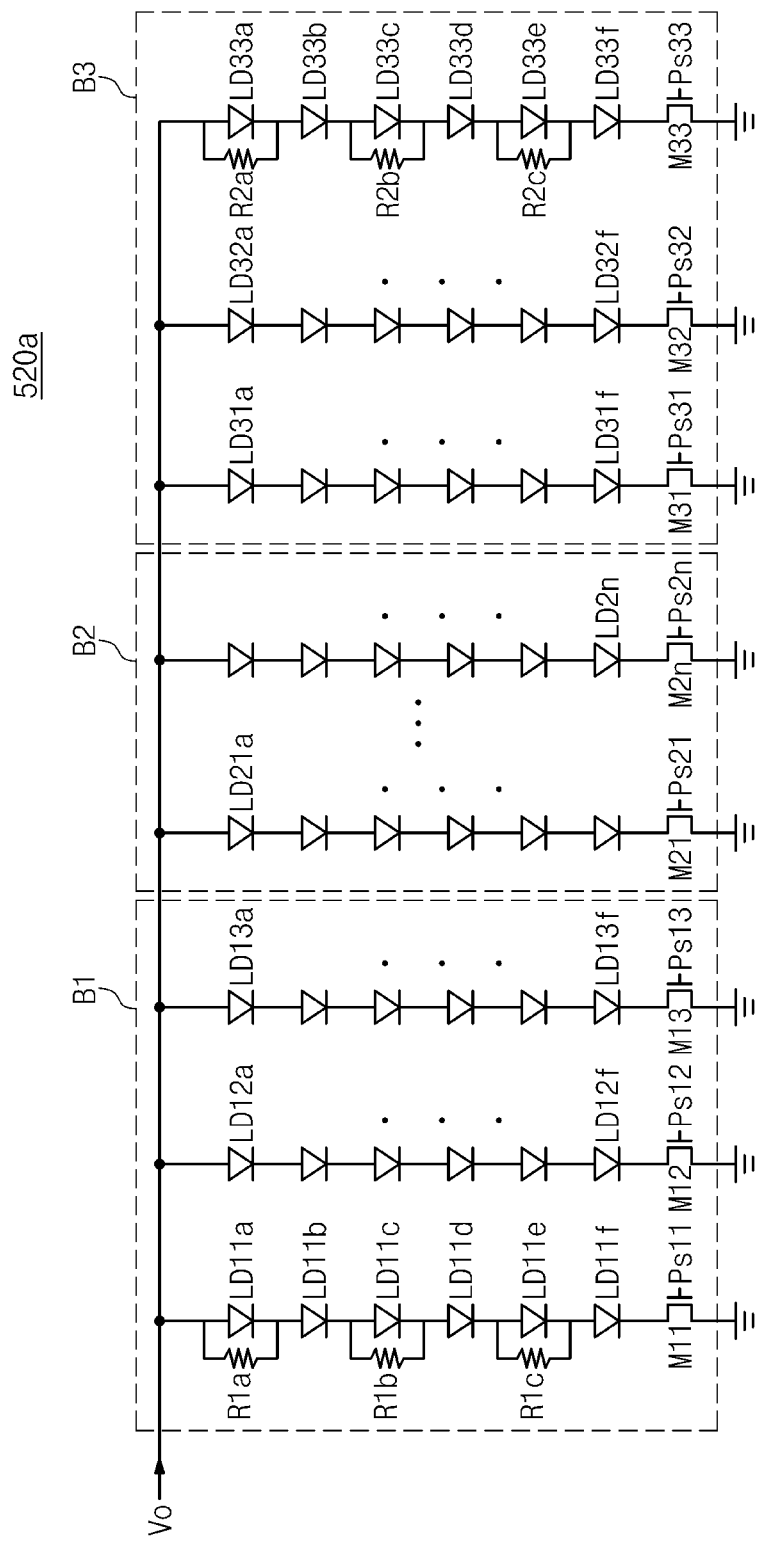
FIG. 5 is a circuit diagram illustrating the LEDs of FIG. 4 according to an exemplary embodiment of the inventive concept.

FIG. 5 is a circuit diagram illustrating the LEDs of FIG. 4 according to an exemplary embodiment of the inventive concept.

Referring to FIGS. 4 and 5, a light source unit 520*a* receives the driving voltage Vo from the DC-DC converter 531. The light source unit 520*a* may output light on the basis of the driving voltage Vo received from the DC-DC converter 531 (see FIG. 3).

For example, in the first group B1 of the driving substrate 530, the first to sixth red LEDs LD11*a* to LD11*f* may be connected in series to one another, the first to sixth blue LEDs LD12*a* to LD12*f* may be connected in series to one another and the first to sixth green LEDs LD13*a* to LD13*f* may be connected in series to one another. The first to sixth red LEDs LD11*a* to LD11*f*, the first to sixth blue LEDs LD12*a* to LD12*f* and the first to sixth green LEDs LD13*a* to LD13*f* are connected in parallel to one another.

Furthermore, a first transistor M11 for controlling the first to sixth red LEDs LD11*a* to LD11*f* may be connected to a source terminal of the sixth red LED LD11*f*. A second transistor M12 for controlling the first to sixth blue LEDs LD12*a* to LD12*f* may be connected to a source terminal of the sixth blue LED LD12*f*. A third transistor M13 for controlling the first to sixth green LEDs LD13a to LD13f may be connected to a source terminal of the sixth green LED LD13f. The first to third transistors M11 to M13 may be controlled by driving signals Ps11 to Ps13 provided to gate terminals of the transistors. The driving signals Ps11 to Ps13 may be provided from the driving control unit 532 (see FIG. 3).

The first, third and fifth red LEDs LD11a, LD11c and LD11e among the first to sixth red LEDs LD11a to LD11f may be the red LEDs RD arranged at the left edge part of the first group B1.

According to an exemplary embodiment of the inventive concept, the first red LED LD11a may be connected in parallel to a first resistor R1a. The third red LED LD11c may be connected in parallel to a second resistor R1b. The fifth red LED LD11e may be connected in parallel to a third resistor R1c. Accordingly, due to the first to third resistors R1a to R1c, an amount of current provided to the first, third and fifth red LEDs LD11a, LD11c and LD11e may be reduced.

For example, since the amount of current provided to the first, third and fifth red LEDs LD11a, LD11c and LD11e is adjusted, output of red light generated at the left edge part of the first group B1 may be adjusted. The first to third resistors R1a to R1c may be set on the basis of color combination between the first, third and fifth red LEDs LD11a, LD11c and LD11e and other LEDs.

In the third group B3 of the driving substrate 530, the first to sixth red LEDs LD31a to LD31f may be connected in series to one another, the first to sixth blue LEDs LD32a to LD32f may be connected in series to one another and the first to sixth green LEDs LD33a to LD33f may be connected in series to one another. The first to sixth red LEDs LD31a to LD31f, the first to sixth blue LEDs LD32a to LD32f and the first to sixth green LEDs LD33a to LD33f are connected in parallel to one another.

Furthermore, a first transistor M31 for controlling the first to sixth red LEDs LD31a to LD31f may be connected to a source terminal of the sixth red LED LD31f. A second transistor M32 for controlling the first to sixth blue LEDs LD32a to LD32f may be connected to a source terminal of the sixth blue LED LD32f. A third transistor M33 for controlling the first to sixth green LEDs LD33a to LD33f may be connected to a source terminal of the sixth green LED LD33f.

The first, third and fifth green LEDs LD33a, LD33c and LD33e among the first to sixth green LEDs LD33a to LD33f may be the green LEDs GD arranged at the right edge part of the third group B3.

According to an exemplary embodiment of the inventive concept, the first green LED LD33a may be connected in parallel to a first resistor R2a. The third green LED LD33c may be connected in parallel to a second resistor R2b. The fifth green LED LD33e may be connected in parallel to a third resistor R2c. Accordingly, due to the first to third resistors R2a to R2c, an amount of current provided to the first, third and fifth green LEDs LD33a, LD33c and LD33e may be reduced.

Since the LEDs LD21a to LD2n arranged in the second group B2 are regularly arranged, the LEDs LD21a to LD2n are not connected in parallel to resistors.

Although it has been described that the amounts of currents provided to the LEDs arranged at the edge parts of the driving substrate 530 with respect to the second direction DR2 (see FIG. 4) are adjusted, the inventive concept is not limited thereto. For example, in the case where LEDs arranged at a long-side edge part of the driving substrate 530 are not regularly arranged, the amounts of currents provided to the LEDs arranged at the long-side edge part of the driving substrate 530 may be adjusted. As a result, each of the LEDs arranged at the long-side edge part of the driving substrate 530 may be connected in parallel to a resistor.

Figure 6:
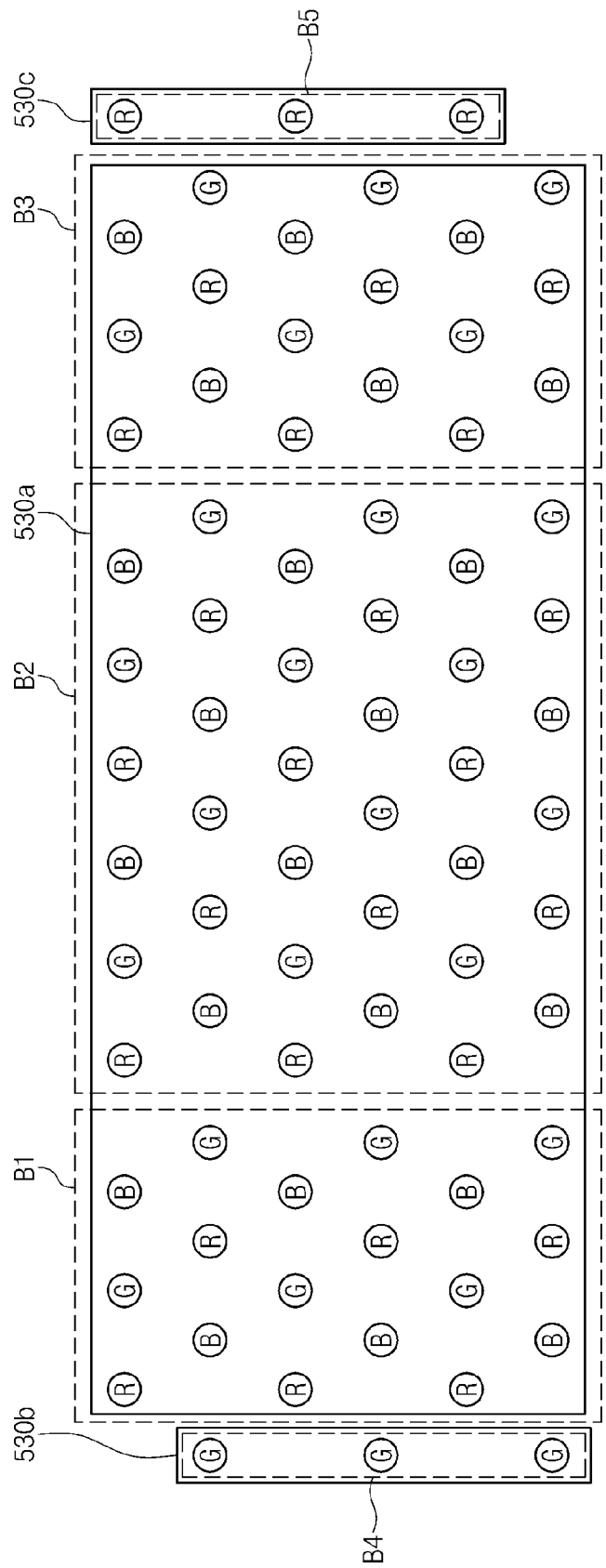
FIG. 6 illustrates a plurality of LEDs arranged on the driving substrate illustrated in FIG. 2 according to an exemplary embodiment of the inventive concept.

FIG. 6 illustrates the plurality of LEDs arranged on the driving substrate illustrated in FIG. 2 according to an exemplary embodiment of the inventive concept.

The configuration of the LEDs arranged on a first driving substrate 530a of FIG. 6 is the same as that of the LEDs arranged on the driving substrate 530 of FIG. 4. Therefore, the same configuration will not be described again.

According to an exemplary embodiment of the inventive concept, second and third driving substrates 530b and 530c for color combination may be arranged adjacent to edge parts of the first driving substrate 530a with respect to the second direction DR2 (see FIG. 4). For example, the LEDs arranged on the second and third driving substrates 530b and 530c may serve to prevent the occurrence of color irregularity at edge parts of the first driving substrate 530a. As a result, the color irregularity that may occur at the short-side edge parts of the first driving substrate 530a may be prevented.

For example, LEDs of the first to third groups B1 to B3 may be arranged on the first driving substrate 530a. LEDs of a fourth group B4 may be arranged on the second driving substrate 530b. LEDs of a fifth group B5 may be arranged on the third driving substrate 530c. Here, the LEDs arranged on the second driving substrate 530b may be the green LEDs G. The LEDs arranged on the third driving substrate 530c may be the red LEDs R.

As an example, since green color components are insufficient at the left edge part of the first group B1, the reliability of light color combination may be degraded. In this case, the second driving substrate 530b including the green LEDs G may be arranged adjacent to the left edge part of the first driving substrate 530a. As a result, the reliability of color combination of light output from the left edge part of the first driving substrate 530a may be increased.

As an example, since red color components are insufficient at the right edge part of the third group B3, the reliability of light color combination may be degraded. In this case, the third driving substrate 530c including the red LEDs R may be arranged adjacent to the right edge part of the first driving substrate 530a. As a result, the reliability of color combination of light output from the right edge part of the first driving substrate 530a may be increased.

As described above, a backlight unit according to an exemplary embodiment of the inventive concept may include LEDs for enhancing the color combination at the edge parts of the first driving substrate 530a.

Figure 7:
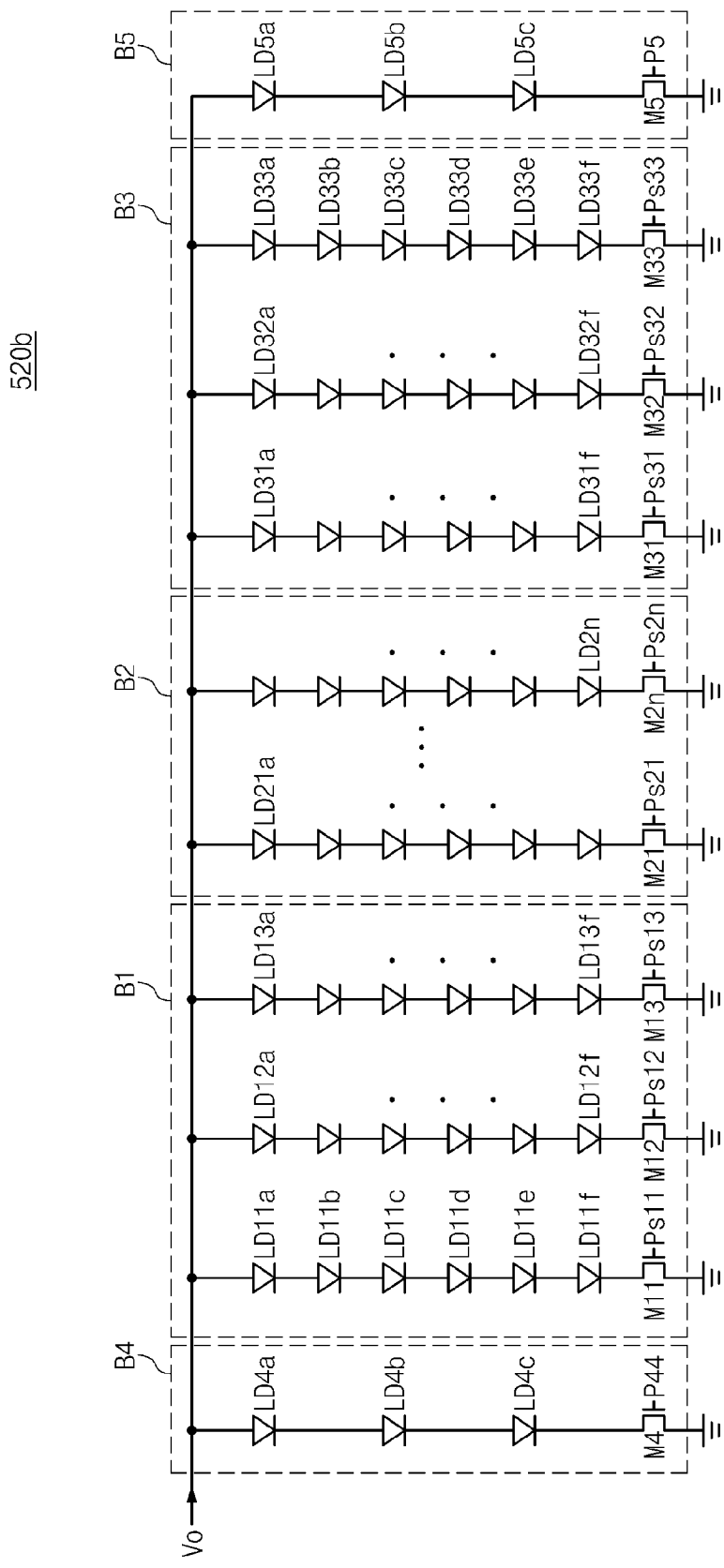
FIG. 7 is a circuit diagram illustrating the LEDs of FIG. 6 according to an exemplary embodiment of the inventive concept.

FIG. 7 is a circuit diagram illustrating a light source unit 520b according to an exemplary embodiment of the inventive concept.

The LEDs of the first to third groups B1 to B3 of FIG. 7 may be the same as the LEDs of the first to third groups B1 to B3 of FIG. 5, except that the LEDs of the first to third groups B1 to B3 of FIG. 7 are not connected in parallel to resistors. Therefore, the LEDs of the first to third groups B1 to B3 will not be described again.

For example, referring to FIGS. 6 and 7, the first to third green LEDs LD4a to LD4c of the fourth group B4 may be connected in series to one another on the second driving substrate 530b. The first to third green LEDs LD4a to LD4c of the fourth group B4 may be connected in parallel to the LEDs of the first to third groups B1 to B3 and fifth group B5.

The third green LED LD4c may be electrically connected to a driving transistor M4. The driving transistor M4 may be operated in response to a driving signal P44 provided to a gate terminal of the driving transistor M4, so that operation of the first to third green LEDs LD4a to LD4c may be controlled on the basis of the operation of the driving transistor M4.

According to an exemplary embodiment of the inventive concept, the first to third green LEDs LD4a to LD4c of the fourth group B4 may be used to enhance color combination with the LEDs arranged at the left edge part of the first group B1.

The first to third red LEDs LD5a to LD5c of the fifth group B5 may be connected in series to one another on the third driving substrate 530c. The first to red LEDs LD5a to LD5c of the fifth group B5 may be connected in parallel to the LEDs of the first to fourth groups B1 to B4.

The third red LED LD5c may be electrically connected to a driving transistor M5. The driving transistor M5 may be operated in response to a driving signal P5 provided to a gate terminal of the driving transistor M5. Operation of the first to third red LEDs LD5a to LD5c may be controlled on the basis of the operation of the driving transistor M5.

According to an exemplary embodiment of the inventive concept, the first to third red LEDs LD5a to LD5c of the fifth group B5 may be used to enhance color combination with the LEDs arranged at the right edge part of the third group B3.

As described above, the backlight unit according to an exemplary embodiment of the inventive concept may include additional LEDs to prevent the occurrence of color irregularity at the edge parts of the display panel 400 (see FIG. 1).

Figure 8:
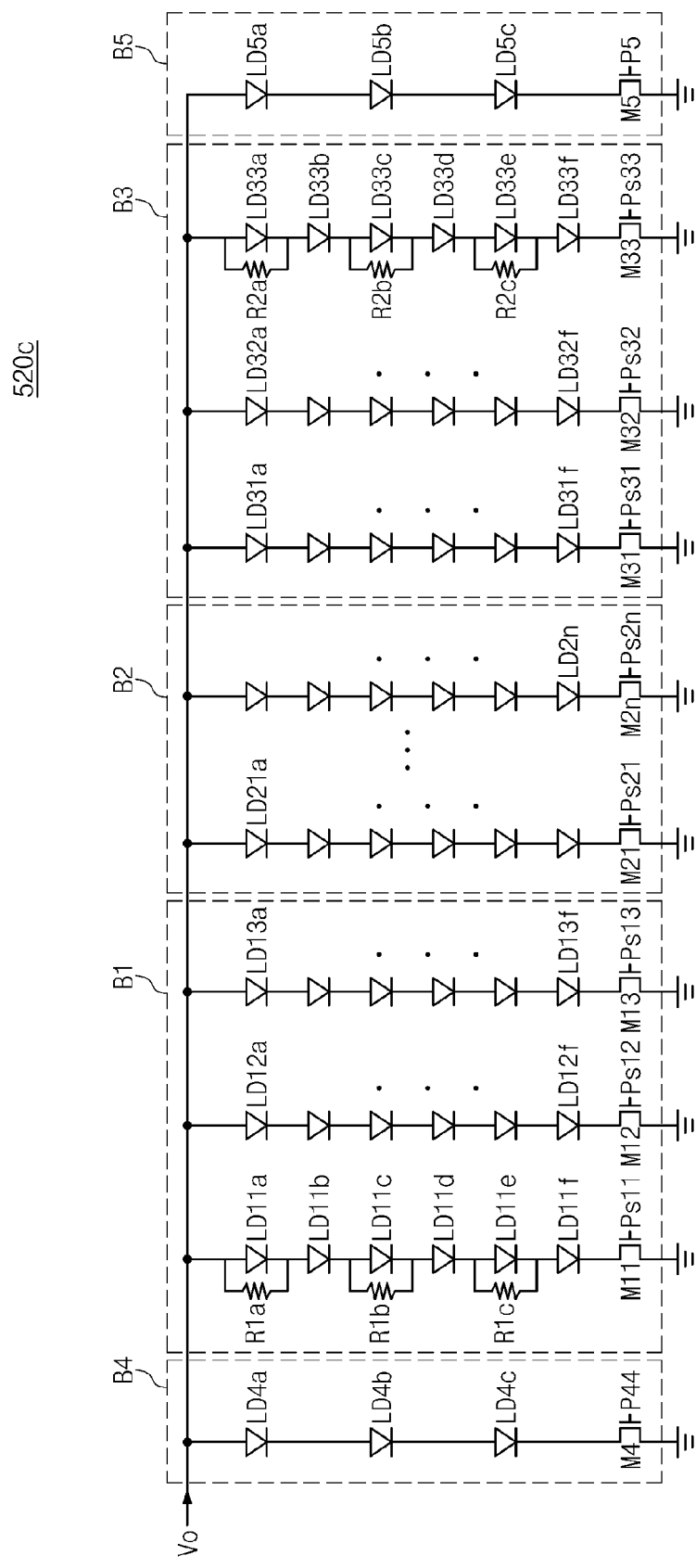
FIG. 8 is a circuit diagram illustrating a plurality of LEDs arranged on the driving substrate illustrated in FIG. 2 according to an exemplary embodiment of the inventive concept.

FIG. 8 is a circuit diagram illustrating a light source unit 520c according to an exemplary embodiment of the inventive concept.

Referring to FIG. 8, a light source unit 520c may be a combination of the light source unit 520a of FIG. 5 and the light source unit 520b of FIG. 7.

For example, the light source unit 520c according to an exemplary embodiment of the inventive concept includes the structure of the light source unit 520a of FIG. 5 in which specific LEDs are connected in parallel to resistors. Furthermore, the light source unit 520c includes the additional LEDs for color combination of the light source unit 520b of FIG. 7. Since the features and structure of the light source unit 520c are the same as those of the light source units 520a and 520b of FIGS. 5 and 7, operation of the light source unit 520 will not be described again.

Although each cluster described above with reference to FIGS. 5 and 7 has a triangular form, the LEDs included in the first to third groups B1 to B3 of FIG. 8 may be arranged in clusters having a triangular or a rectangular shape.

According to an exemplary embodiment of the inventive concept, uniform white light may be emitted from a backlight unit. As a result, the reliability of overall operation of a display device may be enhanced.

The above-disclosed subject matter is to be considered illustrative and not restrictive, and the appended claims are intended to cover all such modifications, enhancements, and other embodiments, which fall within the true spirit and scope of the inventive concept.

What is claimed is:
1. A backlight unit comprising:
a driving substrate; and
a plurality of first clusters and a plurality of second clusters disposed in rows and columns on the driving substrate,
wherein the clusters of the plurality of first clusters and the clusters of the plurality of second clusters are alternately arranged in each row on the driving substrate,
wherein each column of the driving substrate is comprised exclusively of the plurality of first clusters or the plurality of second clusters,
wherein each of the clusters of the plurality of the first clusters and each of the clusters of the plurality of the second clusters comprises a plurality of light emitting diodes (LEDs), the first and second clusters having structures that are inverse with respect to each other, and
wherein each of the LEDs that are most adjacent to row directional edges of the driving substrate, among the LEDs of the first and second clusters, is connected in parallel to a resistor.

2. The backlight unit of claim 1, wherein each of the clusters of the plurality of first clusters and each of the clusters of the plurality of second clusters has an equilateral triangle shape.

3. The backlight unit of claim 1, wherein each of the clusters of the plurality of first clusters and each of the clusters of the plurality of second clusters has an isosceles triangle shape.

4. The backlight unit of claim 1, wherein each of the clusters of the plurality of first clusters and each of the clusters of the plurality of second clusters comprises a red LED, a blue LED and a green LED.

5. The backlight unit of claim 1, wherein the plurality of first clusters and the plurality of second clusters are disposed on the driving substrate on the basis of a plurality of groups.

6. A backlight unit comprising:
a first driving substrate;
a plurality of first clusters and a plurality of second clusters disposed in rows and columns on the first driving substrate; and
a second driving substrate disposed adjacent to a first side of the first driving substrate, the second driving substrate comprising a plurality of first light emitting diodes (LEDs) of only a single color,
wherein the clusters of the plurality of first clusters and the clusters of the plurality of second clusters are alternately arranged in each row on the first driving substrate,
wherein each column of the first driving substrate is comprised exclusively of the plurality of first clusters or the plurality of second clusters, and
wherein each of the clusters of the plurality of first clusters and each of the clusters of the plurality of second clusters comprises a plurality of third LEDs, the first and second clusters having structures that are inverse with respect to each other.

7. The backlight unit of claim 6, wherein each of the clusters of the plurality of first clusters and each of the clusters of the plurality of first clusters comprises a red LED, a blue LED and a green LED.

8. The backlight unit of claim 6, further comprising a third driving substrate disposed adjacent to a second side of the first driving substrate, the third driving substrate comprising a plurality of second LEDs of only a single color.

9. The backlight unit of claim 6, wherein each cluster of the plurality of first clusters and each cluster of the plurality of the second clusters has a triangular shape.

10. The backlight unit of claim 8, wherein the first and second sides are disposed in a row direction.

11. The backlight unit of claim 6, wherein each of the clusters of the plurality of first clusters and each of the clusters of the plurality of second clusters has a rectangular shape.

12. The backlight unit of claim 11, wherein each of LEDs that are most adjacent to a third side of the driving substrate, among the LEDs of the first and second clusters, is connected in parallel to a resistor.

13. A backlight unit comprising:
- a first driving substrate including a first side, a second side, a third side and a fourth side, wherein the first side and the second side are substantially parallel with each other, wherein the third side and the fourth side are substantially parallel with each other and wherein the first side and the third side are perpendicular to each other;
- a plurality of first clusters and a plurality of second clusters disposed in rows and columns on the first driving substrate, wherein rows are substantially parallel with the third side of the first driving substrate and columns are substantially parallel with the first side of the first driving substrate;
- a second driving substrate disposed adjacent to the first side of the first driving substrate, the second driving substrate comprising a plurality of first light emitting diodes (LEDs); and
- a third driving substrate arranged adjacent to the second side of the first driving substrate, the third driving substrate comprising a plurality of second LEDs,
- wherein the clusters of the plurality of first clusters and the clusters of the plurality of second clusters are alternately arranged in each row of the first driving substrate,
- wherein each column of the first driving substrate is comprised exclusively of the plurality of first clusters or the plurality of second clusters,
- wherein each of the clusters of the plurality of first clusters and each of the clusters of the plurality of second clusters comprises a plurality of third LEDs, the first and second clusters having structures that are inverse with respect to each other, and
- wherein each of the third LEDs that are most adjacent to the first side of the first driving substrate, among the LEDs of the first and second clusters, is connected in parallel to a resistor.

14. The backlight unit of claim 13, wherein each of the clusters of the plurality of first clusters and each of the clusters of the plurality of second clusters comprises a red LED, a blue LED and a green LED.

15. The backlight unit of claim 13, wherein each of the first and second LEDs comprise one of red, blue or green LEDs.

16. The backlight unit of claim 13, wherein each of the clusters of the plurality of first clusters and each of the clusters of the plurality of second clusters has an equilateral triangle shape.

17. The backlight unit of claim 13, wherein each of the clusters of the plurality of first clusters and each of the clusters of the plurality of second clusters has an isosceles triangle shape.

18. The backlight unit of claim 13, wherein each of the clusters of the plurality of first clusters and each of the clusters of the plurality of second clusters has a rectangular shape.

19. The backlight unit of claim 18, wherein the plurality of first clusters and the plurality of second clusters are disposed on the first driving substrate on the basis of a plurality of groups.

20. The backlight unit of claim 13, wherein each of LEDs that are most adjacent to the second side of the first driving substrate, among the LEDs of the first and second clusters, is connected in parallel to a resistor.

* * * * *